E. H. AMET.
DEAD BEAT BALANCED ELECTRICAL TRANSMITTER.
APPLICATION FILED MAR. 4, 1916.
1,236,649.
Patented Aug. 14, 1917.
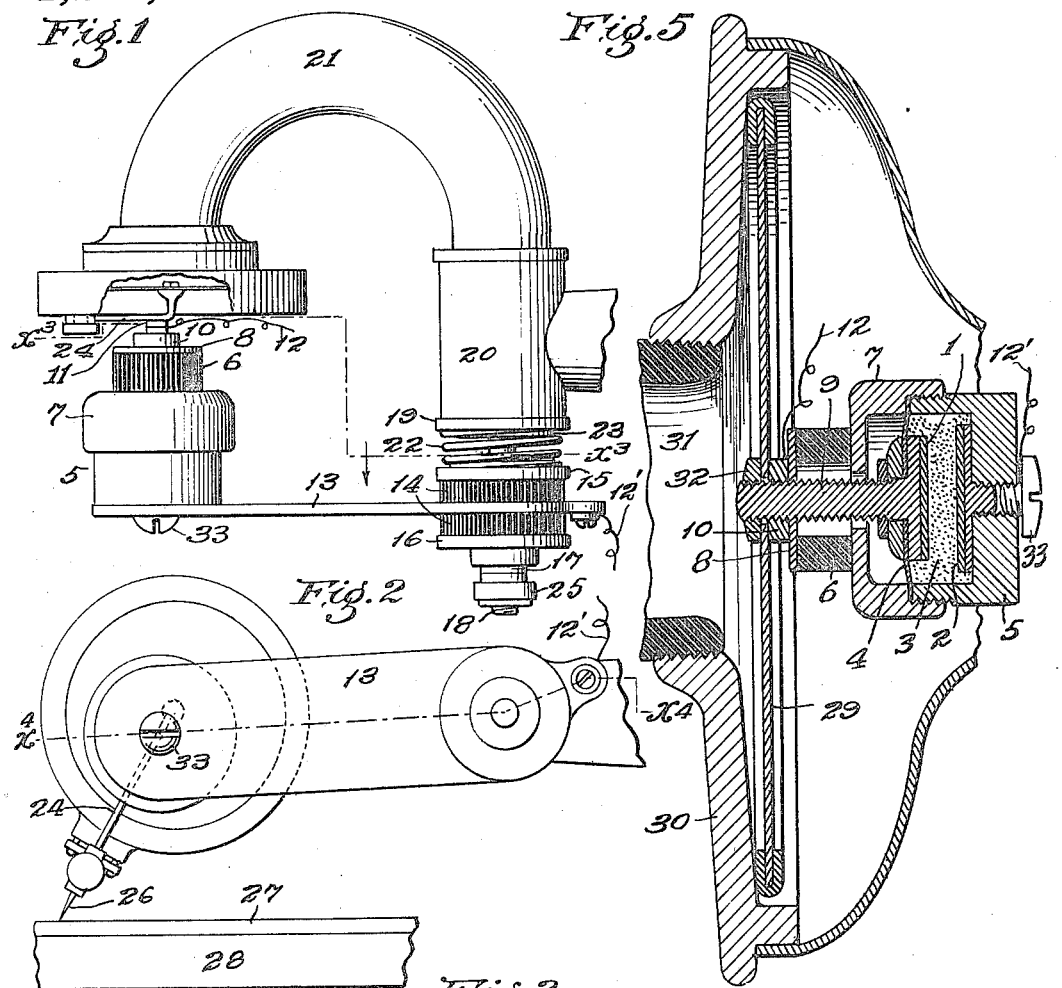
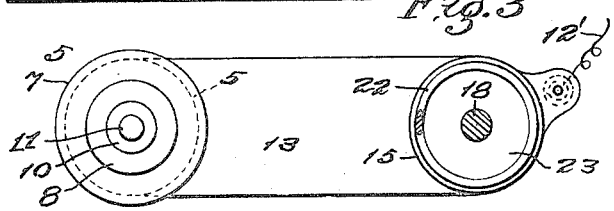
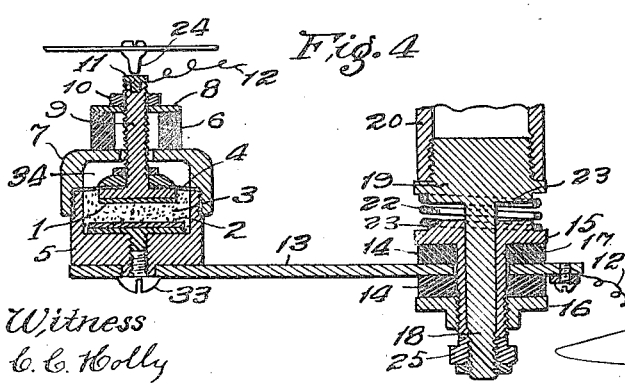
Inventor
Edward H. Amet
by James R. Townsend
his atty.
Witness
C. C. Holly

UNITED STATES PATENT OFFICE.

EDWARD H. AMET, OF REDONDO BEACH, CALIFORNIA.

DEAD-BEAT BALANCED ELECTRICAL TRANSMITTER.

1,236,649.  Specification of Letters Patent.  Patented Aug. 14, 1917.

Application filed March 4, 1916. Serial No. 82,266.

*To all whom it may concern:*

Be it known that I, EDWARD H. AMET, a citizen of the United States, residing at Redondo Beach, in the county of Los Angeles and State of California, have invented a new and useful Dead-Beat Balanced Electrical Transmitter, of which the following is a specification.

This invention relates to that class of electrical transmitters set forth in my application Serial No. 38,349, filed July 6, 1915, patented March 21, 1916, No. 1,176,725, for a broad and basic invention entitled Balanced electrical transmitter.

An object of this invention is to produce a transmitter involving the principles of said balanced electrical transmitter and adapted to receive and transmit talking machine records.

Another object of the invention is to provide an electrical transmitter variable resistance which with its adjustment is self-contained and which may be adjusted to produce the finest results without interfering with the maximum sensitiveness of the impulse-receiving means, or depending on such means for maintaining the adjustment.

An object is to provide a variable electrical resistance which in itself contains means for sensitive separative balanced adjustment not susceptible to overbeat of the maximum impulses applied to actuate the same.

An object is to so construct the device that when thus adjusted it may receive actuating impulses from any device such as a diaphragm or the style bar of a talking machine reproducer or from any mechanical device for transmitting with varying intensity, electrical impulses for sound-reproduction or for the reproduction of engraved or indented characters which require different intensities in the transmitting electrical circuit to reproduce them.

An object of this invention is to produce an electrical transmitter for combination with talking machine reproducing devices for transmitting talking machine records for electrical reproduction.

The transmitter is adapted for use in other relations and I regard it as of special utility for electrical reproduction from talking-machine records for the reason that I am not aware that there has heretofore been produced any transmitting device which in combination with a telephone receiver will accurately reproduce talking-machine records.

The invention is intended to accurately produce electrical impulses in direct ratio to the impulses received to be transmitted.

Heretofore electrical transmitters used in combination with talking machine reproducing devices have had the fault of overvibration with the result that the electrical reproduction thereby effected is composed of the primary impulse and impulses set up by the overvibration, which causes the transmitted record to be reproduced with an echo sound that destroys the articulation of the talking machine record transmitted.

An object of the invention is to avoid all overvibration and to transmit only the impulses received, maintaining in the electrical impulses the true proportion and duration of the talking machine record impulses received for transmission.

An object is to produce an electrical variable resistance having the maximum actuating movement of the flexibly mounted electrode in one direction, and reacting to a practically fixed zero point without by-pass motion or interfering overvibration.

Other objects and advantages may appear from the accompanying drawings and the subjoined detail description and appended claims.

The invention may be applied to various types of talking-machines and in the present application will be shown as an attachment for what is known as the Victor talking-machine.

The accompanying drawings illustrate the invention.

Figure 1 is a plan view of the invention as applied to a well-known commercial talking machine, a fragment of which is shown. A portion is broken away to show the stylus bar and the usual diaphragm of the said talking machine.

Fig. 2 is an elevation of the device shown in Fig. 1 with a fragment of the record and turn-table of said talking machine.

Fig. 3 is an elevation of a portion of the attachment viewed from line $x^3$, Fig. 1, looking in the direction of the arrow.

Fig. 4 is a plan section on line $x^4$, Fig. 2.

Fig. 5 is an enlarged vertical section of the electrical transmitter attached to the diaphragm of a telephone transmitter for telephonic purposes.

The impulse transmitter comprises a plurality of opposing electrodes as 1, 2, a variable electrical resistance 3 between said electrodes, a variable resistance housing as at 4, 5, directly inclosing said electrodes and said variable electrical resistance, and means mounted on said housing and connected to one of the electrodes for limiting the maximum movement of the flexibly mounted one of said electrodes to one direction, viz., the direction away from the other, so that the impulses to be transmitted will have increasing intensity in ratio to the approach of electrode 1 to electrode 2.

The means shown in the drawings for producing this result comprise a non-resonant or dead-beat spring 6 formed of some spring-like material such as india rubber yieldingly separating the electrodes by exerting a stress upon the supporting diaphragm 4 independent of the impulse collector in such a manner as to produce a practical stop or zero point of adjustment from which point the flexibly mounted electrode is free to move toward the other electrode to compress the variable electrical resistance, the reaction returning the electrode to its normal relative position with a minimum by-pass or overheat.

The portion of the housing marked 4 is a mica diaphragm supporting the movable electrode 1, which is connected thereto in the usual way. Said supporting diaphragm 4 is held in place by a cover 7 screwed onto base 5 of the housing and clamping the mica diaphragm 4 against said base. The rubber spring 6 is supported by the cover 7 and in turn supports a washer 8 through which the threaded adjustable electrode stem 9 passes for connection with the adjusting nut 10, impulse receiving point 11 and electrical connection 12.

The electrode stem thus passes through the variable resistance housing formed by the member 5 and cover 7, and by means of the dead-beat spring 6, the washer 8 and the nut 10 supports and applies tension to the electrode 1 and its flexible diaphragm 4 without exerting stress on the energizing means, viz., the diaphragm 29.

The adjustment whereby the motion of the flexibly mounted electrode is made dead-beat is accomplished by screwing the nut 10 on the electrode stem 9 against the washer 8. This compresses the rubber spring cylinder washer 6 and draws the flexibly mounted electrode 1 away from the electrode 2 by exerting a stress upon the supporting diaphragm 4.

The practical adjustment of the transmitter is to have the nut 10 exert sufficient pressure upon the rubber cylinder 6 to draw the electrodes apart to almost the limit of the spring tension of the supporting diaphragm 4. This adjustment while allowing the diaphragm supported electrode to move freely toward the stationary electrode 2 prevents interfering reaction from by-passing the zero point established by the aforesaid adjustment of the electrode.

Said impulse receiving point is preferably non-metallic on the form of talking-machine shown so as to avoid the transmission of the metallic tone of the needle.

The non-resonant spring 6 may be made of a hollow cylindrical piece of soft rubber and is sufficiently compressed by the adjusting nut 10 to exert the proper normal pull on the supporting diaphragm 4 to produce nearly a maximum chamber for the variable resistance.

By exerting an outward pull upon the flexible diaphragm and thus normally holding the diaphragm practically at the limit of the chamber increasing movement, the space occupied by the granular resistance in the chamber is normally of maximum size, so that when the impulse is applied thereto through the diaphragm, a corresponding compression is effected with a corresponding increased conductivity so that the impulse varies the electrical resistance in direct ratio; and consequently, the electrical impulse transmitted corresponds to the mechanical impulse initiating the mechanical movement.

In mounting the transmitter on the type of talking-machine shown in the drawings a supporting arm 13 which may be a flat electrical conductor such as a metal bar, is mounted between non-resonant resilient washers 14 that are preferably of firm soft rubber and compressed between clamping flanges 15, 16 connected by the sleeve 17 that is fixed to the flange 15 and is threaded to receive the flange 16. Said sleeve is mounted on a post 18 carried by a boss or body 19 that is screwed into one end of the head 20 of the talking-machine goose-neck 21. Said body 19 takes the place of the usual finishing nut on said head. The compression spring 22 mounted on bosses 23 of the body 19 and flange 15 holds the arm 13 yieldingly in position friction-tight, so that said arm may be adjusted to bring the non-resonant contact 11 into a desired engagement with the style bar 24. A nut 25 is screwed onto the post 18 and thereby this adjustment is effected. On actuation of the style bar 24 by the style 26 which is actuated by a record 27 on turn-table 28, the impulse is imparted from an impulse imparting device and electrode actuating means such as a telephone transmitter diaphragm 29, to the electrode 1 which is in contact with the variable resistance and operates the same in proportion to the impulse received. Reflex action returns the electrode to initial position with dead-beat, and without interfering by-pass movement.

The diaphragm 29 of the telephone transmitter will be mounted in the telephone housing 30 with the usual mouth-piece in a usual well known manner, not fully illustrated in Fig. 5, and the electrode stem 9 is fixed to the diaphragm by the clamping nut 32 screwed on the stem 9 and clamping the diaphragm between said nuts 10 and 32.

The electrical connection 12' in the several figures may be secured directly to the housing 5 by binding screw 33; or said binding screw 33 may be applied to hold the housing member 5 on the supporting arm 13.

In Fig. 5 the granular resistance is shown as nearly filling the chamber in the housing prepared to contain said resistance and the electrodes, and it is understood that said resistance may be differently arranged in any effective manner to connect between the electrodes to serve the well-known purpose of such resistance.

The supporting mica diaphragm 4 is shown forced outwardly by the resiliency of the spring 6 exerting a pressure against the washer 8, nut 10, stem 9 and supporting diaphragm 4. Said supporting mica diaphragm 4 is clamped on the electrode stem in the usual way by the nut 34.

It is seen by the foregoing that I have provided an electrical transmitter adapted for combination with any means for collecting and imparting sound-wave or other impulses, said transmitter being complete in itself and not dependent upon the sound collecting and imparting means for the maintenance of operative adjustment.

I claim:—

1. An impulse transmitter comprising a variable electrical resistance for transmitting electrical impulses from an impulse imparting device, said resistance comprising a housing, opposing electrodes under separating stress, variable electrical resistance connecting said electrodes, and resilient means for maintaining the working adjustment of said electrodes independently of, and imparting no stress to, the impulse imparting device.

2. An impulse transmitter comprising a plurality of opposing electrodes, a variable electrical resistance between said electrodes, a housing for inclosing said electrodes and variable electrical resistance, and means for maintaining a separating dead-beat tension between said electrodes, consisting of opposing spring-like diaphragm 4 and spring collar 6; said means allowing free movement of one electrode toward the other and tending to react without over-vibration to the primary adjustment.

3. An impulse transmitter comprising a plurality of opposing electrodes, a variable electrical resistance between said electrodes, a housing inclosing said electrodes and variable electrical resistance and means for limiting the maximum movements of said electrodes to one direction preferably toward each other so that the impulses to be transmitted will have increasing intensity in ratio to the impulse applied to the flexibly mounted electrode, the means for producing this result comprising a dead-beat spring, of spring-like material, compressed against the housing and yieldingly separating the electrodes.

4. An electrical impulse undulatory current transmitter comprising a variable electrical resistance; opposing electrodes; means for energizing the electrodes; means for actuating one of the electrodes; means for mounting the electrodes, and tension means for maintaining a balanced relation between said electrodes; said tension means exerting no stress on the actuating means.

5. An impulse transmitter comprising a plurality of opposing electrodes, a flexible mounting for one of the electrodes, a variable electrical resistance between said electrodes, a housing inclosing said electrodes and said variable electrical resistance, tension means on said housing, and means extending through the housing and connecting said tension means to the flexibly mounted electrode for limiting the maximum movement of such electrode to one direction.

In testimony whereof, I have hereunto set my hand at Los Angeles, California, this 28th day of February 1916.

EDWARD H. AMET.

Witness:
JAMES P. TOWNSEND.

Copies of this patent may be obtained for five cents each, by addressing the "Commissioner of Patents, Washington, D. C."